May 12, 1964 J. SHERMAN 3,133,247
ELECTRORESPONSIVE THERMAL METER EMPLOYING REVERSELY
ARRANGED BIMETALLIC STRUCTURES
Filed July 25, 1960

WITNESSES:

INVENTOR
Jerome Sherman.
BY
ATTORNEY

United States Patent Office 3,133,247
Patented May 12, 1964

3,133,247
ELECTRORESPONSIVE THERMAL METER EMPLOYING REVERSELY ARRANGED BIMETALLIC STRUCTURES
Jerome Sherman, South Orange, N.J., assignor to Westinghouse Electric Corporation, East Pittsburgh, Pa., a corporation of Pennsylvania
Filed July 25, 1960, Ser. No. 44,931
11 Claims. (Cl. 324—104)

This invention relates to a thermal device and has particular relation to a thermal meter which is responsive to electrical quantities for producing a response representative of a function of the product of the energizing electrical quantities.

Thermal meters have previously been provided which include a pair of bimetallic spiral springs secured to a common shaft for rotating the shaft in response to heating of the springs. The springs are wound in opposing directions relative to the shaft to rotate the shaft in accordance with the difference in heating of the springs. If the springs are of identical construction, such arrangement affords compensation of the meter for variations in ambient temperature.

Such thermal meters have been employed in the past for producing an indication of the maximum energy demand of an associated alternating current circuit. To this end, one of the springs is heated in accordance with the vector sum of the alternating voltage and current of the circuit, whereas the other spring is heated in accordance with the vector difference between the voltage and the current of the circuit. With this arrangement, the associated shaft is rotated in accordance with a function of the product of voltage and current of the associated circuit.

In accordance with the present invention, a thermal meter is provided which includes single thermoresponsive unit constructed of a pair of joined multimetallic coils each having a free end. The free end of the first of the coils may be secured to a suitable support, whereas the free end of the second coil is free for movement relative to the free end of the first coil in response to heating of the coil. A member movable relative to the support may be secured to the other free end for rotation in response to movement of such free end.

According to a specific embodiment of the invention, one end of a first bimetallic strip coil is joined to one end of a second bimetallic strip coil concentric and coaxial with the first coil to form a single coil unit. The two coils are wound in the same sense, taking the junction of the coils as the starting point or taking the free end of each of the coils as a starting point for the associated coil, or in opposite senses starting at one of the free ends and tracing therefrom the convolutions of the coil unit through the junction of the two coils to the other free end. The free end of one of the coils is secured to a suitable support, the free end of the other coil having a shaft secured thereto which is mounted for rotation about the common axis of the coils. The component metals of the two coils are so arranged that the coils tend to rotate the associated shaft in opposing directions in response to heating of the coils.

A thermal meter constructed in accordance with the invention conveniently is employed to produce a response representative of the energy demand of an alternating current circuit. To this end, one of the coils is heated in accordance with the vector sum of voltage and current of the alternating current circuit, and the other coil is heated in accordance with the vector difference between voltage and current of the circuit. With such arrangement, rotation of the associated shaft is dependent upon the net difference in heating of the coils, the magnitude of such rotation thereby being a function of the product of voltage and current of the circuit. The coils may be heated in any suitable manner.

According to a preferred embodiment of the invention, the coils are heated by passing electrical currents representative of the aforesaid sum and difference directly through the respective coils. To this end, a suitable connection is made to the free end of each of the coils and to the junction of the coils intermediate the free ends. A current which is proportional to the voltage of the circuit is passed through the joined coils in series by means of the connections at the free ends. A current proportional to the current flowing in the circuit is passed through each of the coils in parallel by means of the intermediate connection and the connections at the free ends.

By suitable proportioning of the coils, the meter may be compensated for variations in ambient temperature. For this purpose, each coil is fabricated of the same metals, and the length dimensions of bimetallic strip included in the respective coils are made substantially equal. With this arrangement, the coils will be equally affected by variations in ambient temperature, with the result that rotation of the associated shaft will be unaffected by such variations.

It is, therefore, an object of the invention to provide an improved thermal device.

It is another object of the invention to provide an improved thermal meter for producing a response representative of a function of the product of voltage and current of an energizing circuit.

It is a further object of the invention to provide a thermal meter including translating means operable in response to energization of a plurality of strip members each formed of a plurality of layers of materials having different coefficients of thermal expansion, for producing a response which is a function of the product of voltage and current in an energizing circuit.

It is still another object of the invention to provide a thermal meter as defined in the preceding paragraph which is effectively compensated for variations in ambient temperature.

It is a still further object of the invention to provide a thermal meter including a pair of joined concentric, coaxial bimetallic coils cooperating when energized to rotate a shaft in accordance with a function of the product of voltage and current of an energizing circuit.

It is an additional object of the invention to provide a combination energy and demand measuring instrument which comprises a watthour meter and a thermal meter as defined in the preceding paragraph.

Other objects of the invention will be apparent from the following description taken in conjunction with the accompanying drawings, in which.

Figure 1:
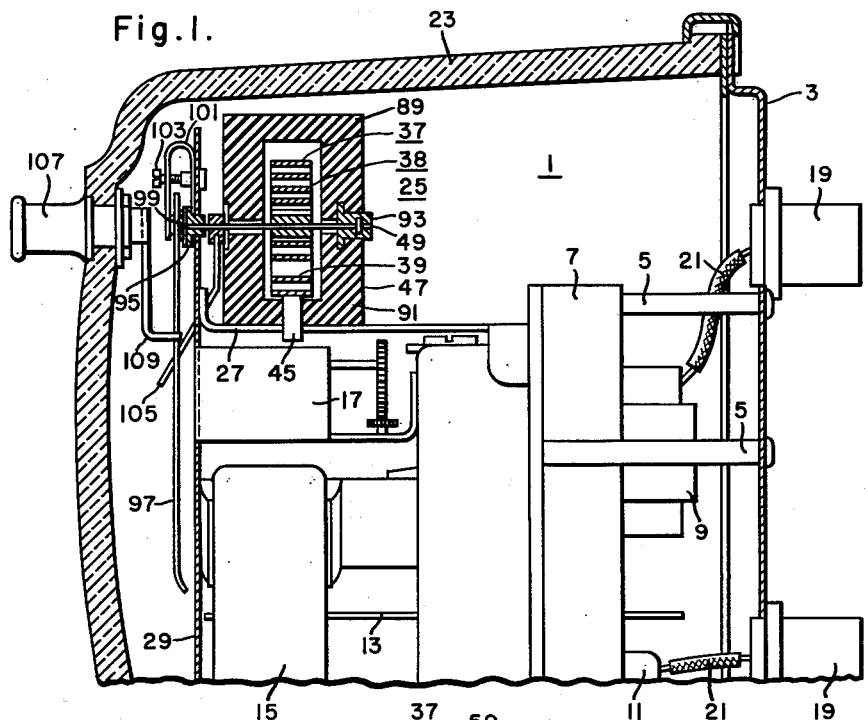
FIGURE 1 is a sectional view with parts broken away of a measuring instrument embodying the invention.

Referring to the drawings, FIGURE 1 illustrates a measuring instrument represented generally by the numeral 1 embodying the teachings of the invention. The instrument 1 comprises an integrating watthour meter for measuring the energy of an associated alternating current circuit.

The meter is of conventional construction. The operating parts of the meter are secured to a suitable base plate 3 by means of pillars 5. The meter 1 includes an electromagnetic structure 7 having voltage and current windings 9 and 11, respectively, for the purpose of establishing when energized a shifting magnetic field. A suitable armature in the form of a disc 13 is mounted for rotation under the influence of the magnetic field. Rotation of the disc 13 is retarded by means of a suitable permanent magnet 15. A register 17 is associated with the disc 13 for the purpose of integrating the rotation of the disc 13.

The casing for the meter 1 may vary considerably in construction. In the embodiment of FIGURE 1, the casing is designed to provide a detachable meter. For this purpose, the base plate 3 is provided with a plurality of contact blades 19, which extend from the plate 3 but which are insulated therefrom. The blades 19 are connected to the voltage and current windings 9 and 11 through suitable conductors 21. The casing includes a cover 23 preferably formed of a transparent material, such as glass, to permit inspection of the register 17. The cover 23 is associated detachably with the plate 3 to surround the operating parts of the meter 1 when in an attached condition. The meter 1 is designed for mounting on a suitable socket (not shown) with the blades 19 engaging contact jaws (not shown) carried by the socket. A suitable construction for the casing and socket of a detachable watthour meter is shown in the Bradshaw et al. Patent No. 1,969,499.

In order to measure the maximum demand of energy supplied through an associated circuit, a maximum demand measuring device 25 conveniently is associated with the watthour meter within the same cover 23. The device 25 may be mounted on a supporting shelf 27 which is carried by the meter. A face plate 29 is also supported by the meter for a purpose appearing hereinafter.

Maximum demand measuring devices previously have been constructed in a variety of forms. A thermal maximum demand measuring device heretofore has been provided which includes a pair of bimetallic spiral springs differentially associated with a common shaft. When the springs are heated, they tend to rotate the shaft in opposing directions. By heating the springs respectively in accordance with the sum and difference of the voltage and current in an energizing electrical circuit, the shaft will rotate in accordance with a function of the product of such voltage and current.

With the above-described arrangement, variations in ambient temperature which affect both springs equally have no appreciable affect on the rotation of the shaft. Consequently, such temperature variations have little affect on the accuracy of the demand measuring device. A suitable construction for a thermal demand device is illustrated in the Vassar Patent 2,323,738.

In accordance with the present invention, a thermal demand measuring device is provided which includes a pair of joined, concentric and coaxial multi-metallic coils effective when energized for operating an associated translating device in accordance with a function of the product of the energizing electrical quantities. According to a preferred embodiment of the invention, each coil is fabricated of bimetallic strip. The coils conveniently are proportioned to provide compensation for variations in ambient temperature so that such temperature variations have substantially no affect on the operation of the translating device.

Figure 2:
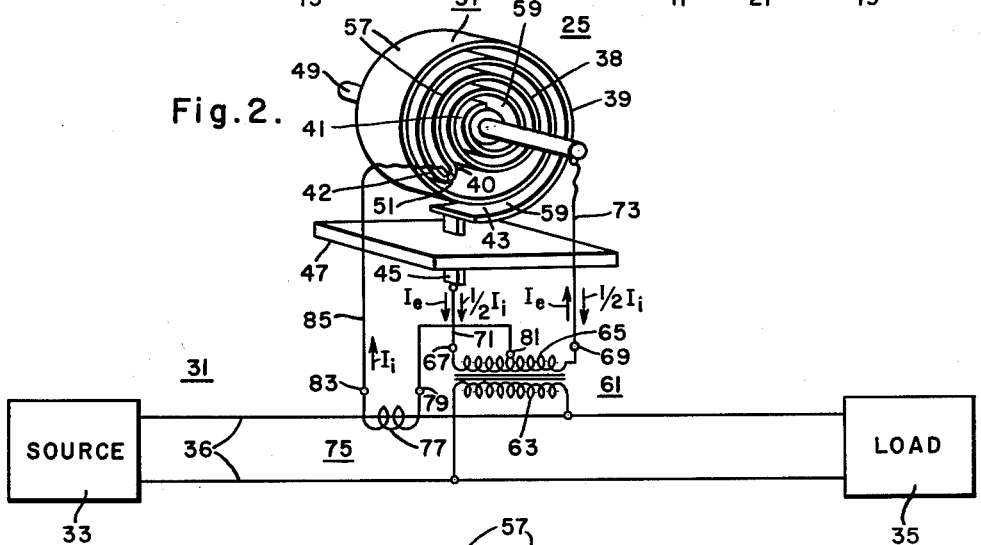
FIGURE 2 is a schematic view showing circuit connections for a part of the instrument of FIGURE 1.

Referring to FIGURE 2, the device 25 is connected for energization from a suitable electrical circuit 31, including a source of potential 33 for supplying electrical energy to a load device 35 through suitable conductors 36. Although the device 25 may be employed in connection with either direct or alternating quantities, the device 25 is utilized to advantage with alternating quantities. Consequently, it will be assumed for the purpose of discussion that the circuit 31 comprises a single-phase alternating current circuit operating at a frequency of 60 cycles per second.

As is shown in FIGURE 2, the device 25 includes a single coil unit 37 formed of a pair of electroconductive coils 38 and 39 having ends 40, 41 and 42, 43, respectively.

The end 43 of the coil 39 engages a suitable electroconductive terminal 45 which is secured to a support conveniently forming a part of an insulating housing 47 enclosing the coils, as is shown in FIGURE 1. The end 41 of the coil 38 is secured to a suitable translating device illustrated as comprising a shaft 49. The end 41 is free for movement relative to the end 43 is response to predetermined heating of the coils.

It will be recalled that it is desired that the coils when heated shall tend to rotate the shaft 49 in opposing directions. Any configuration of the coil unit 37 which meets this requirement is satisfactory. In the specific embodiment of the invention illustrated in FIGURES 1, 2 and 3, this is accomplished by directing and arranging the metals of two multimetallic coils as follows.

Each of the coils 38 and 39 is wound in the general form of a spiral. The ends 40 and 42 of the respective coils are joined as by soldering, brazing, welding or any other suitable means at a point represented by the numeral 51 intermediate the ends 41 and 43. If the point 51 is taken as a starting point, it will be observed that the two coils are wound in the same sense, i.e., clockwise, as viewed in FIGURE 2. Conversely, if the end 43, for example, is taken as a starting point for tracing therefrom the convolutions of the coil unit 37 through the junction point 51 to the end 41, it will be found that the two coils are wound in opposite senses, that is, counterclockwise for the coil 39 and clockwise for the coil 38, as viewed in FIGURE 2. Conveniently, the coils are so wound that they lie substantially in a common plane which is transverse to the common axis of the coils.

Figure 3:
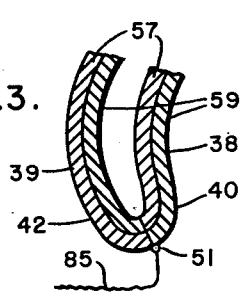
FIGURE 3 is an enlarged view in section of a portion of the part of FIGURE 2.

Referring to FIGURE 3, each coil preferably is formed of two layers of the same dissimilar metals or alloys having different coefficients of thermal expansion. Any suitable metals or alloys may be employed which possess the desired thermal characteristics. For the purpose of discussion, it will be assumed that the corresponding sides 57 of the coils are the low thermal expansion sides and that the corresponding opposing sides 59 of the coils are the high thermal expansion sides. Thus by joining the coils as previously described, the component metals of the coils are reversely arranged at the junction point 51 so that the outside 57 of each of the convolutions of each coil is the low expansion side thereof, and the inside 59 of each of the convolutions of each coil is the high expansion side thereof.

With such arrangement, the end 41 of the coil 38 will move relative to the end 43 of the coil 39 when the coils are heated to different temperatures. The coils may be heated in any suitable manner. In accordance with a preferred embodiment of the invention, the coils are heated by passing electrical currents directly through the coils. By proper energization of the coils, rotation of the shaft 49 may be made to depend upon energy flowing in the circuit 31. Connections suitable for this purpose are illustrated in FIGURE 2.

Referring to FIGURE 2, the coils 38 and 39 are connected serially for energization by a current $I_e$, which varries in accordance with the voltage of the circuit 31. To this end, a voltage transformer 61 may be provided having primary and secondary windings 63 and 65, respectively. The secondary winding 65 includes terminals 67 and 69, each connected to a separate one of the coil ends 41 and 43. Thus, the terminal 67 is connected to the end 43 through a conductor 71, which engages the terminal 45. The terminal 69 conveniently may be connected to the end 41 through a flexible conductor 73, which is secured to a portion of the shaft 49.

Each of the coils 38 and 39 also is heated by a current which varies in accordance with the current flowing in the circuit 31. A current $I_1$ proportional to the current in the circuit 31 may be obtained by means of a current transformer 75, which is connected for energization from the circuit 31 in accordance with current flowing in the circuit. The transformer 75 has a secondary winding 77 which includes a terminal 79 connected to a center tap 81 of the secondary winding 65 and a terminal 83 which is connected to the junction point 51 of the coils 38 and 39 through a flexible conductor 85. With such connections, the coils 38 and 39 comprise two arms of a parallel circuit which is connected in series circuit relationship with the secondary winding 77. The coils are so proportioned that each coil carries current which is approximately one-half of the current $I_1$ which flows through the secondary 77.

Instantaneous directions of flow of the currents $I_e$ and $I_1$ are indicated in FIGURE 2 by arrows associated with such currents. It will be observed that the directions of flow are such that the currents $I_e$ and $\frac{1}{2}I_1$ add vectorially in the outer coil 39 and subtract vectorially in the inner coil 38. Consequently, when the device 25 is connected for energization from the circuit 31 as described, a larger resultant current will flow in the coil 39 than flows in the coil 38 when current flows in the circuit 31.

It will be recalled that the high expansion metal of the bimetallic strip is assumed to be at the inside of each of the convolutions of each of the coils 38 and 39. Thus, when the device 25 is energized from the circuit 31, the coil 39 tends to expand, with the result that the point 51 moves in a clockwise direction, as viewed in FIGURE 2. This causes the shaft 49 to rotate in a clockwise direction, as viewed in FIGURE 2. Similarly, energization of the device 25 from the circuit 31 also operates to expand the coil 38. Such expansion, however, tends to effect rotation of the shaft 49 in a counterclockwise direction, as viewed in FIGURE 2. Inasmuch as the coil 39 is heated to a greater extent than the coil 38 when current flows in the circuit 31, the net difference in coil heating effects rotation of the shaft 49 in a clockwise direction as viewed in FIGURE 2. It can be shown that the shaft 49 will rotate in accordance with a function of the product of voltage and current of the circuit 31 when the coils 38 and 39 are energized as previously described.

It is to be understood that the connections may be such as to effect heating of the coil 38 in accordance with the vector sum of the voltage and the current, and the coil 39 in accordance with the vector difference of the voltage and the current. Such connections would effect rotation of the shaft in a counterclockwise direction, as viewed in FIGURE 2, rather than clockwise, as is the case with the connections shown in FIGURE 2. It is to be understood further that each of the coils 38 and 39 may be disposed with the high expansion side thereof at the outside of each of the respective coil convolutions. With this arrangement energization of the coil 39 in accordance with the vector sum of the voltage and the current, and energization of the coil 38 in accordance with the vector difference of the voltage and the current would be effective to rotate the shaft in a counterclockwise direction, as viewed in FIG. 2.

Referring to FIGURE 1, the coil unit 37 is enclosed by the heat-insulating housing 47. The housing preferably comprises detachable cover and base portions 89 and 91, respectively, to facilitate the installation and removal of the coil unit. The portions 89 and 91 engage each other in a plane which is transverse to the plane of the paper and which passes lengthwise through the shaft 49. The shaft 49 is mounted for rotation about the common axis of the coils 38 and 39 by means of suitable bearings 93 and 95 secured respectively to the housing 47 and the plate 29.

Rotation of the shaft 49 may be indicated in any suitable manner. In the embodiment of FIGURE 1, a demand pointer 97 is mounted for rotation over the plate 29. The pointer 97 is affixed to a stub shaft 99, which extends into the bearing 95. The shaft 99 is urged toward the bearing 95 by a spring 101, which is adjustable for exerting a desired pressure upon the shaft 99 by means of a screw member 103. A suitable scale (not shown) may be printed on the plate 29 for cooperation with the pointer 97. A suitable pusher arm 105 is secured to the shaft 49 for rotation therewith. The arm 105 projects through a slot (not shown) in the plate 29 for engagement with the pointer 97. Consequently, the pointer 97 will assume a position which corresponds to the maximum rotation of the shaft 49 and the arm 105 during any desired period.

In order to reset the pointer 97 at the end of this period, a knob 107 may be actuated to rotate a suitable arm 109 secured thereto into engagement with the pointer 97 to return the pointer into engagement with a suitable zero stop (not shown). At this point, the arm 109 slips over the poiner 97 to leave the pointer free for further actuation by the pusher arm 105.

By means of the invention a thermal meter of extremely compact construction is provided which has a minimum number of parts and small axial dimensions as compared to prior art meters. These features afford considerably more space, in comparison with prior art devices, for auxiliary apparatus and watthour meter parts in a combination energy and demand measuring instrument such as is illustrated in FIGURE 1.

In order to compensate the device 25 for variations in ambient temperature, the invention provides that the bimetallic strip material of which the coils 38 and 39 are fabricated be of substantially constant width and that the junction point 51 be mid-way between the coil ends 41 and 43, i.e., that the length dimensions of bimetallic strip in the respective coils 38 and 39 are equal. Consequently, variations in ambient temperature will affect both of the coils equally, with the result that rotation of the shaft 49 will be unaffected by such changes, since the coils tend to rotate the shaft in opposing directions, as heretofore explained.

The invention also may be employed to compensate various types of instruments for changes in ambient temperature. For example, certain instruments, such as those of the moving vane type, include a single spiral control or biasing spring formed of a single strip of unimetallic spring material having a pair of ends, each of which is connected to a separate one of the associated rotor and stator structures of the instrument. The length dimension of such a spring varies in accordance with changes in ambient temperature, with the result that rotation of the rotor is affected by such changes.

By employing a single strip having the configuration of the coil unit 37 of FIGURE 2 in place of the above-described control or biasing spring, rotation of the rotor, represented generally by the shaft 49, may be made independent of changes in ambient temperature. For such application, the strip may be formed of unimetallic spring material, such as Phosphor bronze, which is reversely bent upon itself intermediate the strip ends. In order to compensate the instrument for variations in ambient temperature, portions of the strip respectively corresponding to the coils 38 and 39 are provided with substantially equal length dimensions. With this arrangement, the length dimensions of such strip portions will vary equally in response to changes in ambient temperature, with the result that rotation of the rotor is unaffected by such changes, as will be understood from the foregoing discussion of the operation of the coils 38 and 39.

Since numerous changes may be made in the above-described construction and since different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a thermal device, a thermoresponsive unit comprising a pair of joined strip members having equal width dimensions, each of said strip members being formed of a plurality of layers of materials having different coefficients of thermal expansion, each of said strip members having a separate free end constituting an end of said unit, a support member, one of said ends being secured to said support member, the other of said ends being free for movement relative to said one end, translating means comprising a rotatable shaft in engagement with and secured to said other end, said unit being disposed between two planes which are transverse to said shaft and which are spaced by a distance substantially equal to said width dimensions, said strip members being so configured and the component materials of each of said strip members being so arranged relative to each other and to the materials of the other of said strip members that said strip members tend to rotate said shaft in opposing directions when heated, and means effective when energized for heating said members to different temperatures, whereby said shaft rotates in response to movement of said other end in accordance with said difference in heating of said members.

2. In a thermal meter for measuring a function of the product of voltage and current in an electrical circuit, a thermoresponsive unit comprising a pair of joined portions each formed of bimetallic strip material, each of said portions having a separate free end constituting an end of said unit, the width dimension of said bimetallic strip material included in said portions being substantially constant, the length dimensions of said bimetallic strip material included in said portions being substantially equal, a support member, one of said ends being secured to said support member, the other of said ends being free for movement relative to said one end, translating means comprising a rotatable shaft in engagement with and secured to said other end, said unit being disposed between two planes which are transverse to said shaft and which are spaced by a distance substantially equal to said width dimension, said unit portions being so configured and the component metals of each of said portions being so arranged relative to each other and to the component metals of the other of said portions that said portions tend to rotate said shaft in opposing directions when heated, and means effective when energized for heating one of said portions in accordance with the sum of said voltage and current in said circuit and the other of said portions in accordance with the difference between said voltage and current in said circuit, whereby when said portions are so heated said shaft rotates in response to movement of said other end to produce a resultant response which is a function of the product of voltage and current in said circuit.

3. In a thermal device, a thermoresponsive unit comprising a pair of concentric, coaxial, joined coils, each formed of bimetallic strip material, a support member supporting said unit, translating means responsive to movement of said unit relative to said support member, the convolutions of each of said coils being so directed and the component metals of each of said coils being so arranged relative to each other and to the component metals of the other of said coils that said coils tend to move said translating means in opposing directions when heated, and means effective when energized for heating said coils to different temperatures, whereby when said coils are so heated said translating means responds to movement of said unit relative to said support member in accordance with said difference in heating of said coils.

4. In a thermal device, a thermoresponsive unit comprising a pair of concentric, coaxial, joined coils, each formed of the same bimetallic strip material, the width dimension of said bimetallic strip material included in said coils being substantially constant, the length dimensions of said bimetallic strip material included in said coils being substantially equal, each of said coils having a separate free end constituting an end of said unit, a support member, one of said ends being secured to said support member, the other of said ends being free from movement relative to said one end, translating means responsive to movement of said other end, the convolutions of each of said coils being so directed and the component metals of each of said coils being so arranged relative to each other and to the component metals of the other of said coils that said coils tend to move said translating means in opposing directions when heated, and means effective when energized for heating said coils to different temperatures, whereby when said coils are so heated said translating means responds to movement of said other end in accordance with said difference in heating of said coils.

5. In a thermal device, a thermoresponsive coil unit formed of bimetallic strip material and comprising a pair of concentric and coaxial spiral coils, one end of a first of said coils being joined to one end of the second of said coils to form said coil unit, each of said coils having a separate free end constituting an end of said unit, said first coil being wound in a sense opposite to the winding sense of said second coil starting at one of said free ends and tracing therefrom the convolutions of said coil unit through the junction of said one ends to the other of said free ends, the component metals of said strip material being reversely arranged at said junction and continuing therefrom in such arrangement to said free ends, a support member, said one free end being secured to said support member, said other free end being free for movement relative to said one free end in response to heating of said coils, means effective when energized for heating said coils to different temperatures, and translating means responsive to movement of said other end in accordance with said difference in heating of said coils.

6. In a thermal meter for measuring a function of the product of voltage and current in an electrical circuit, a thermoresponsive coil unit formed of bimetallic strip material and comprising a pair of concentric and coaxial spiral coils, one end of a first of said coils being joined to one end of the second of said coils to form said coil unit, each of said coils having a separate free end constituting an end of said unit, said first coil being wound in a sense opposite to the winding sense of said second coil starting at one end of said free ends and tracing therefrom the convolutions of said coil unit through the junction of said one ends to the other of said free ends, the component metals of said strip material being reversely arranged at said junction and continuing therefrom in such arrangement to said free ends, the width dimension of said bimetallic strip material included in said coils being substantially constant, the length dimensions of said bimetallic strip material included in said coils being substantially equal, a support member, said one free end being secured to said support member, said other free end being free for movement relative to said one free end in response to differential heating of said coils, means effective when energized for heating one of said coils in accordance with the sum of said voltage and current in said circuit and the other of said coils in accordance with the difference between said voltage and current in said circuit, and translating means operable in response to movement of said other free end when said coils are so heated for producing a resultant response which is a function of the product of said voltage and current in said circuit.

7. In a thermal meter for measuring a function of the product of voltage and current in an electrical circuit, a thermoresponsive coil unit formed of bimetallic strip material and comprising a pair of concentric and coaxial spiral coils, one end of a first of said coils being joined to one end of the second of said coils to form said coil unit, each of said coils having a separate free end constituting an end of said unit, said first coil being wound in a sense opposite to the winding sense of said second coil starting at one of said free ends and tracing therefrom the convolutions of said coil unit through the junction of said one ends to the other of said free ends, the component metals of said strip material being reversely arranged at said junction and continuing therefrom in such arrangement to said free ends, the width dimension of said bimetallic strip material included in said coils being substantially constant, the length dimensions of said bimetallic strip material included in said coils being substantially equal, said coil unit being disposed between two planes which are transverse to the common axis of said coils and which are spaced by a distance substantially equal to the width dimension of said bimetallic material, a support member, said one free end being secured to said support member, said other free end being free for movement relative to said one free end in response to differential heating of said coils, means effective when energized from said electrical circuit for directing current through one of said coils to heat said one coil in accordance with the sum of said voltage and current in said circuit and for directing current through the other of said coils to heat said other coil in accordance with the difference between said voltage and current in said circuit, and translating means operable in response to movement of said other free end when said coils are so heated for producing a resultant response which is a function of the product of said voltage and current in said circuit, said translating means comprising a shaft paralleling the common axis of said coils and secured to said other free end for rotation about said common axis.

8. A thermoresponsive coil unit formed of bimetallic strip material and comprising a pair of concentric and coaxial spiral coils, one end of a first of said coils being joined to one end of the second of said coils to form said coil unit, each of said coils having a separate free end constituting an end of said unit, said first coil being wound in a sense opposite to the winding sense of said second coil starting at one of said free ends and tracing therefrom the convolutions of said coil unit through the junction of said one ends to the other of said free ends, the component metals of said strip material being reversely arranged at said junction and continuing therefrom in such arrangement to said free ends, the width dimension of said bimetallic strip material included in said coils being substantially constant, the length dimensions of said bimetallic strip material included in said coils being substantially equal, said coil unit being disposed between two planes which are transverse to the common axis of said coils and which are spaced by a distance substantially equal to the width dimension of said bimetallic material.

9. In a combination energy and demand measuring instrument for an electrical circuit, a watthour meter having operating parts adapted to be connected for energization from said electrical circuit to produce a response representative of electrical energy in the circuit, a base member supporting said operating parts, a cover secured to said base member to provide an enclosure for said operating parts, and a thermal demand meter including a thermoresponsive coil unit formed of bimetallic strip material and comprising a pair of concentric and coaxial spiral coils, one end of a first of said coils being joined to one end of the second of said coils to form said coil unit, each of said coils having a separate free end constituting an end of said unit, said first coil being wound in a sense opposite to the winding sense of said second coil starting at one of said free ends and tracing therefrom the convolutions of said coil unit through the junction of said one ends to the other of said free ends, the component metals of said strip material being reversely arranged at said junction and continuing therefrom in such arrangement to said free ends, the width dimension of said bimetallic strip material included in said coils being substantially constant, the length dimensions of said bimetallic strip material included in said coils being substantially equal, said coil unit being disposed between two planes which are transverse to the common axis of said coils and which are spaced by a distance substantially equal to the width dimensions of said bimetallic material, a support member, said one free end being secured to said support member, said other free end being free for movement relative to said one free end in response to differential heating of said coils, means effective when energized from said electrical circuit for directing current through one of said coils to heat said one coil in accordance with the sum of said voltage and current in said circuit and for directing current through the other of said coils to heat said other coil in accordance with the difference between said voltage and current in said circuit, translating means operable in response to movement of said other free end when said coils are so heated for producing a resultant response which is a function of the product of said voltage and current in said circuit, said translating means comprising a shaft paralleling the common axis of said coils and secured to said other free end for rotation about said common axis, and an insulating housing enclosing said thermoresponsive coil unit, said thermal demand meter being positioned within said cover with said shaft extending along a straight line which is perpendicular to said base member.

10. In a thermal device, a thermoresponsive coil unit formed of bimetallic strip material and comprising a pair of concentric and coaxial spiral coils, one end of a first of said coils being joined to one end of the second of said coils to form said coil unit, each of said coils having a separate free end constituting an end of said unit, said first coil being wound in a sense opposite to the winding sense of said second coil starting at one of said free ends and tracing therefrom the convolutions of said coil unit through the junction of said one ends to the other of said free ends, the component metals of said strip material being reversely arranged at said junction and continuing therefrom in such arrangement to said free ends, a support member, said one free end being secured to said support member, said other free end being free of movement relative to said one free end in response to differential heating of said coils, translating means responsive to movement of said other free end in accordance with said differential heating, and heating means effective when energized for heating at least one of said coils, said heating means comprising circuit means for directing electrical current through said one coil, said circuit means including a flexible electroconductive lead secured to said junction and an electroconductive lead coupled to the free end of said one coil.

11. In a thermal meter for measuring a function of the product of voltage and current in an electrical circuit, a thermoresponsive coil unit formed of bimetallic strip material and comprising a pair of concentric and coaxial spiral coils, one end of a first of said coils being joined to one end of the second of said coils to form said coil unit, each of said coils having a separate free end constituting an end of said unit, said first coil being wound in a sense opposite to the winding sense of said second coil starting at one of said free ends and tracing therefrom the convolutions of said coil unit through the junction of said one ends to the other of said free ends, the component metals of said strip material being reversely arranged at said junction and continuing therefrom in such arrangement to said free ends, the width dimension of said bimetallic strip material included in said coils being substantially constant, the length dimensions of said bimetallic strip material included in said coils being substantially equal, said coil unit being disposed between two planes which are transverse to the common axis of said coils and which are spaced by a distance substantially equal to the width dimension of said bimetallic material, a support member, said one free end being secured to said support member, said other free end being free for movement relative to said one free end in response to differential heating of said coils, translating means operable in response to movement of said other free end when said coils are so heated for producing a resultant response which is a function of the product of said voltage and current in said circuit, said translating means comprising a shaft paralleling the common axis of said coils and secured to each other free end for rotation about said common axis, and heating means effective when energized from said electrical circuit for heating each of said coils, said heating means comprising circuit means for directing current through one of said coils to heat said one coil in accordance with the sum of said voltage and current in said circuit and for directing current through the other of said coils to heat said other coil in accordance with the difference between said voltage and current in said circuit, said circuit means including a first flexible electroconductive lead secured to said junction and a second flexible electroconductive lead coupled to said free end to which said shaft is secured for permitting said rotation of said shaft, and an electroconductive lead coupled to said free end secured to said support member.

References Cited in the file of this patent

UNITED STATES PATENTS

| | | |
|---|---|---|
| 278,173 | Osgood | May 22, 1883 |
| 602,527 | Sullivan | Apr. 19, 1898 |
| 1,458,924 | Banan | June 19, 1923 |
| 2,063,705 | Smulski | Dec. 8, 1936 |
| 2,284,082 | Bloch | May 26, 1942 |
| 2,323,738 | Vassar | July 6, 1943 |
| 2,949,778 | Hemion | Aug. 23, 1960 |

FOREIGN PATENTS

| | | |
|---|---|---|
| 147,503 | Switzerland | Aug. 17, 1931 |